United States Patent [19]

Tanaka et al.

[11] Patent Number: 5,008,120

[45] Date of Patent: Apr. 16, 1991

[54] METHOD OF PREPARING IRON-FORTIFIED BEVERAGE

[75] Inventors: Maki Tanaka; Teiichi Tojima; Shun-ichi Dousako; Kiyoshi Tatsumi, all of Saitama, Japan

[73] Assignee: Snow Brand Milk Products Co., Ltd., Hokkaido, Japan

[21] Appl. No.: 551,922

[22] Filed: Jul. 12, 1990

[30] Foreign Application Priority Data

Jul. 21, 1989 [JP] Japan ................................. 1-189563
Apr. 26, 1990 [JP] Japan ................................. 2-110953

[51] Int. Cl.$^5$ ............................................. A23L 1/304
[52] U.S. Cl. ..................................... 426/74; 426/590
[58] Field of Search ................................... 426/74, 590

[56] References Cited

U.S. PATENT DOCUMENTS

| | | | |
|---|---|---|---|
| 4,402,938 | 9/1983 | Collins | 426/583 |
| 4,667,018 | 5/1987 | Prieels | 426/656 |
| 4,726,948 | 2/1988 | Prieels | 426/658 |
| 4,762,822 | 8/1988 | Ettenger | 426/532 |
| 4,791,193 | 12/1988 | Okonogi | 426/657 |
| 4,834,994 | 5/1989 | Kuwata | 426/658 |
| 4,919,961 | 4/1990 | Lundblad | 426/648 |
| 4,944,944 | 7/1990 | Tang | 426/2 |
| 4,946,944 | 8/1990 | Frankinet | 426/657 |

*Primary Examiner*—Carolyn Paden
*Attorney, Agent, or Firm*—Burgess, Rayn & Wayne

[57] ABSTRACT

A method of preparing iron-fortified beverage, wherein either aqueous solution of lactoferrin, iron and sodium bicarbonate or aqueous solution of iron lactoferrin is adjusted to the ionic strength to satisfy the conditions given by the formulae below and sterilized by heat; solution of the ingredients other than the above is also sterilized by heat; and the two are mixed to obtain the product: and a method of processing iron-fortified beverage, wherein all ingredients including lactoferrin are dissolved in water and, if the ionic strength of the solution is adjustable to the conditions given by the following formulae, adjusted to the ionic strength given, and sterilized by heat to obtain the product.

$$\log I \leq -T/66.7 - 0.1$$

(wherein $60 \leq T \leq 80$)

$$\log I \leq -1.3$$

$(T \geq 80)$ (T indicates temperature of sterilization in degrees Celsius.)

4 Claims, 4 Drawing Sheets

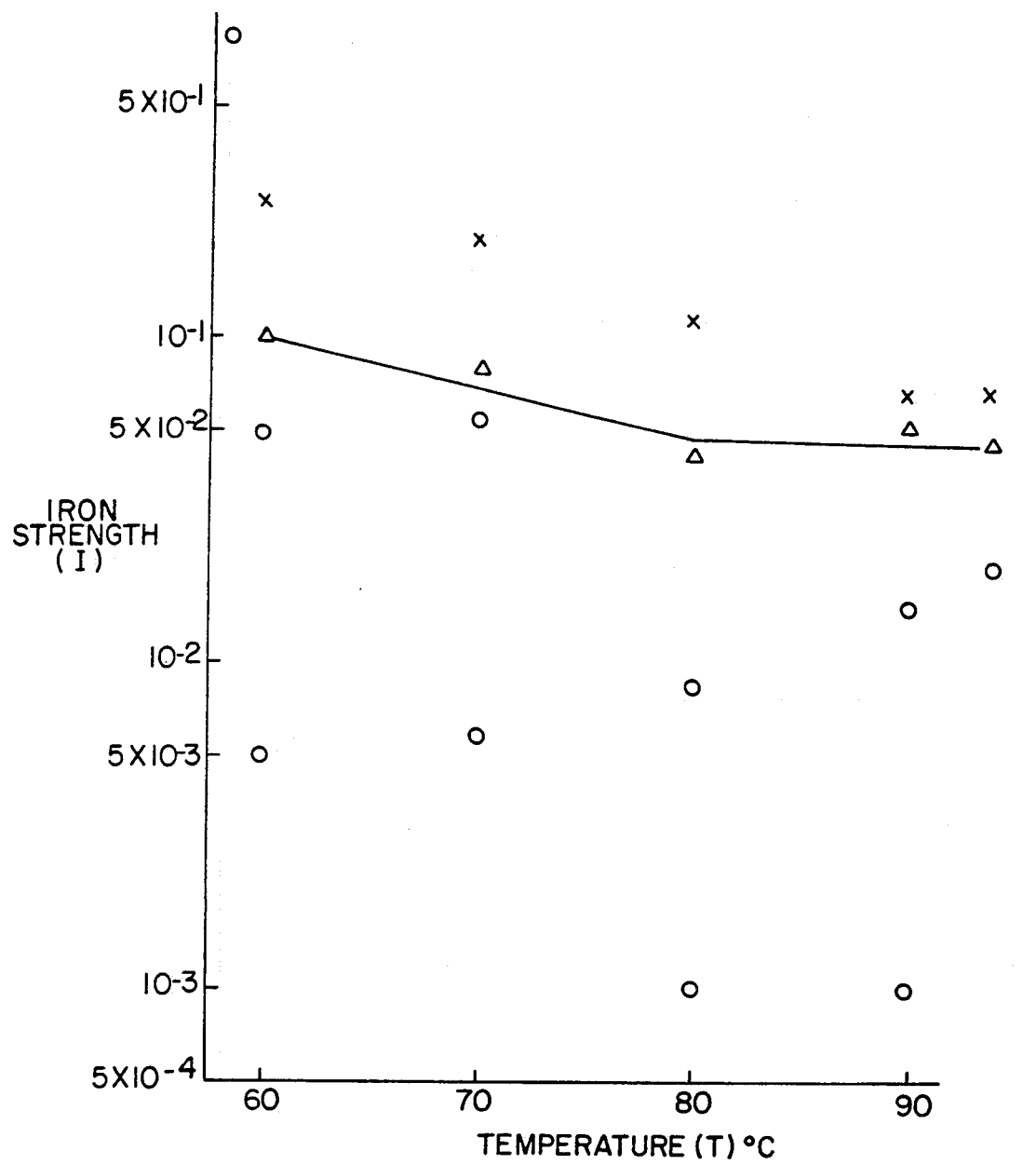
F I G. 1

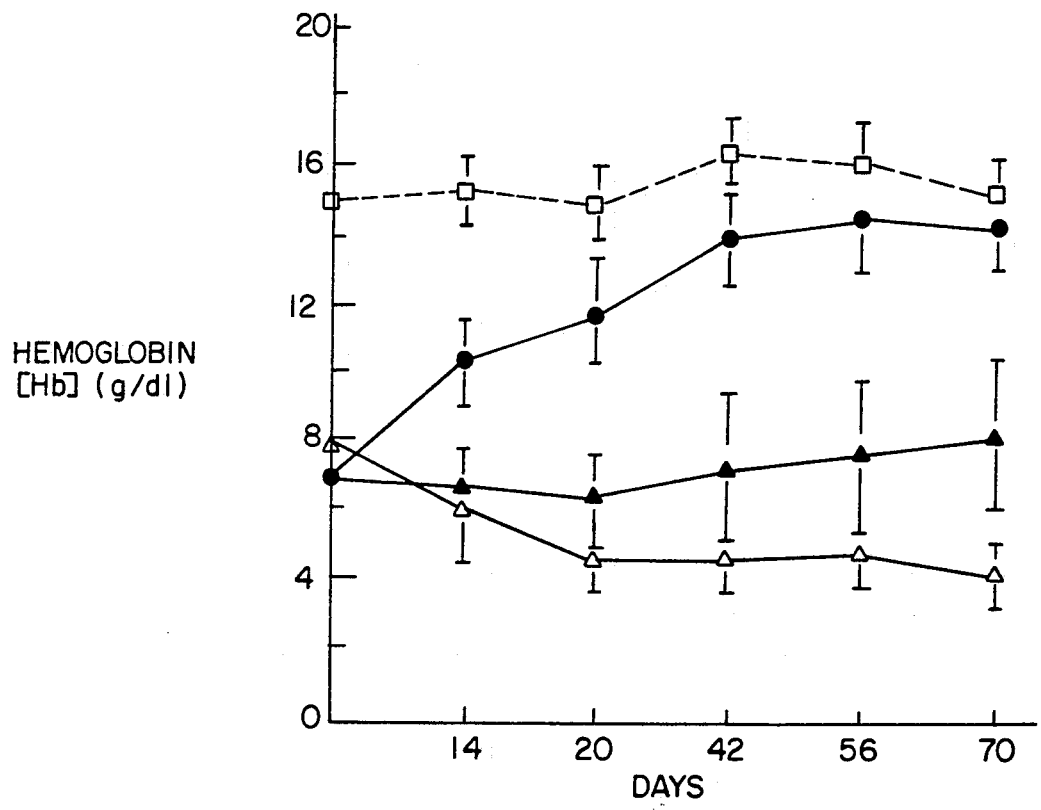
F I G. 2

□ GROUP GIVEN MARKET FEED
△ GROUP GIVEN IRON-ELIMINATED FEED AND DEIONIZED WATER
● GROUP GIVEN IRON-FORTIFIED BEVERAGE OF THE PRESENT INVENTION
▲ GROUP GIVEN BEVERAGE WITH FERROUS CITRATE BUT NOT LACTOFERRIN

□ GROUP GIVEN MARKET FEED
△ GROUP GIVEN IRON-ELIMINATED FEED AND DEIONIZED WATER
● GROUP GIVEN IRON-FORTIFIED BEVERAGE OF THE PRESENT INVENTION
▲ GROUP GIVEN BEVERAGE WITH FERROUS CITRATE BUT NOT LACTOFERRIN

METHOD OF PREPARING IRON-FORTIFIED BEVERAGE

BACKGROUND OF THE INVENTION

The present invention relates to a method of preparing iron-fortified beverage; particularly, a method of preparing iron-fortified beverage containing lactoferrin capable of binding iron.

DESCRIPTION OF THE PRIOR ART

According to Japan national nutrition survey in 1987, average iron intake of the Japanese people stood at 98% of the average recommended allowance, showing a slight deficiency.

It is said that among young women and athletes, in particular, there are quite a few who are anemic or potentially anemic (latent iron deficiency) due to the insufficient iron intake or to the increase in iron excretion.

Those who are latent iron deficiency are more or less normal within the range of their daily activity, but are likely to develop anemic condition during and after strenuous physical activity or under psychological stress.

Although the shortage of iron intake is a matter of concern for many people as seen, most people do not receive medication of iron preparations unless they develop anemic symptoms. Even if they are aware of their anemic tendency, they are often reluctant to eat conventional iron-rich foods, mainly because such foods do not please their palate.

Several iron-supplement food products in the form of beverage are on the market, but many of them employ, as iron preparation, inorganic iron salts (sodium ferrous citrate, for example). However, since absorption ratio of inorganic iron from the digestive tract is said to be about 5% beverages containing inorganic iron are hardly an effective iron supplement. Aside from beverages, other iron-supplement foods products on the market include those that incorporate heme iron, which is said to have higher absorption ratio. But heme-iron preparation is usually enclosed in capsules because of its somewhat unpleasant taste, resulting in higher production cost and less semblance of a food product.

Recently developed is a hematopoietic preparation whose active ingredient is lactoferrin capable of binding iron, prepared by chelating ferric ion to lactoferrin separated from milk, and utilization of this hematopoietic preparation as ingredient for various food products and beverages has been proposed (Japanese Patent Laid-Open Publication No. 63-22525).

However, when hematopoietics described above are used by adding to beverages and dissolving, one problem here is that beverages are required to be sterilized by heat, which destroys the three-dimensional structure of lactoferrin and causes precipitation, depriving lactoferrin of its inherent physiological functions and, eventually, of its capability to chelate iron.

Japanese Food Sanitation Law stipulates in its standards for processing soft drinks that they must be sterilized; (1) by heat at 65 degrees Celsius for 10 minutes, or by a method with equivalent effect, if the drink's pH is lower than 4.0, (2) by heat at 85 degrees Celsius for 30 minutes, or by a method with equivalent effect, if the drink's pH is 4.0 or higher.

SUMMARY OF THE INVENTION

An object of the present invention relates to the method of producing iron-fortified beverage that contain lactoferrin capable of binding iron, which is stable under heat.

Another object of the present invention relates to the method of producing iron-fortified beverage that contain lactoferrin capable of binding iron, which has a high ratio of absorption from the digestive tract and retains lactoferrin's physiological functions.

Yet another object of the invention relates to the method of producing tasty iron-fortified beverage that contains lactoferrin capable of binding iron.

These objects of the present invention are achieved by: preparing either aqueous solution of lactoferrin, iron preparation and sodium bicarbonate, or aqueous solution of iron lactoferrin; and adjusting its ionic strength so that it meets the conditions provided by the formulae that follow; sterilizing by heat and cooling it; preparing solution of usual beverage ingredients; sterilizing by heat and cooling it; and then mixing the above two solutions to make iron-fortified beverage.

$$\log I \leqq -T/66.7 - 0.1$$

(wherein $60 \leqq T \leqq 80$)

$$\log I \leqq -1.3$$

($T \geqq 80$)

(T indicates temperature of sterilization in degrees Celsius.)

If the ionic strength (I) of the mixture of both aqueous solution described above are adjustable to meet the conditions given by the above formulae, the objects of the present invention are also achieved by first mixing the two solutions, adjusting the ionic strength (I) to meet the aforementioned conditions, and sterilizing by heat and cooling it to make iron-fortified beverage.

BRIEF DESCRIPTION OF THE DRAWINGS

FIG. 1 indicates the relationship between the ionic strength and the temperature of the aqueous solution of lactoferrin and its iron-binding capacity.

FIG. 2 shows changes of blood hemoglobin [Hb] level with the passage of days when the beverage of the present invention is given, together with the results of control;

DETAILED DESCRIPTION OF PREFERRED EMBODIMENTS

Figure 3:
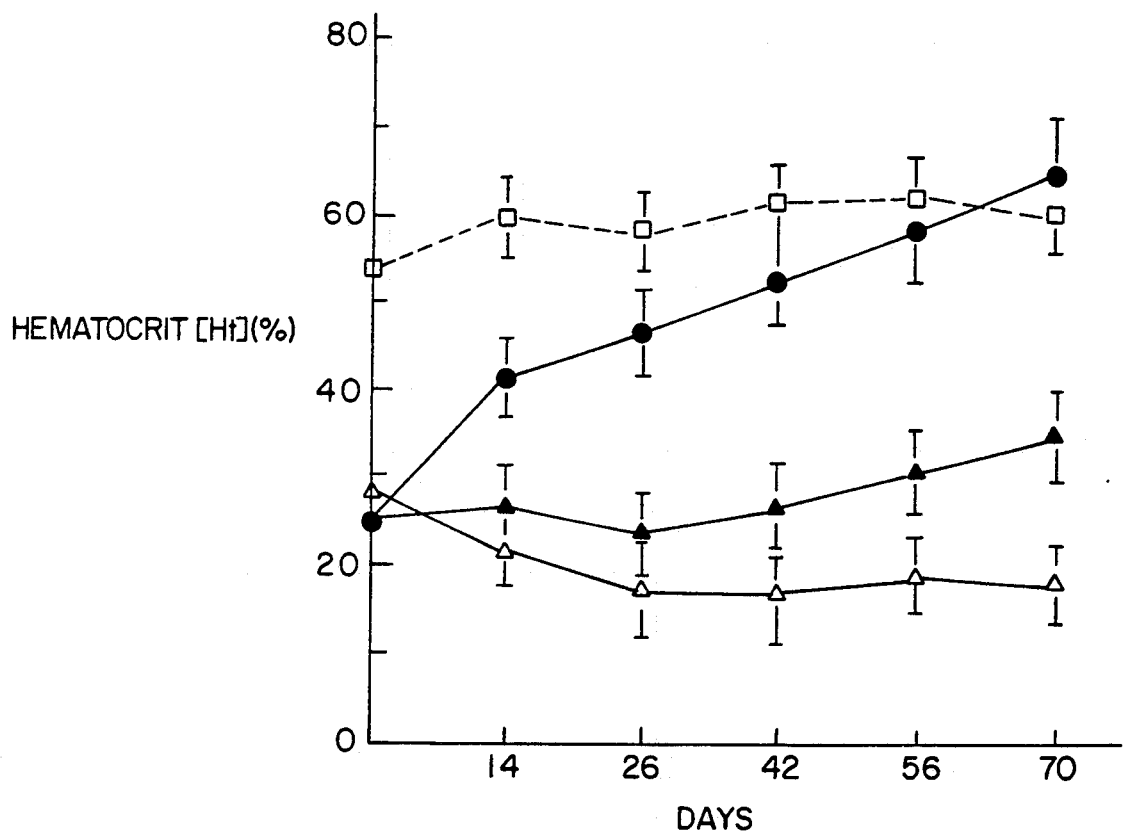
FIG. 3, likewise shows the changes of hematocrit [Ht] level with the passage of days.

Lactoferrin, used along with iron preparation in the present invention, is a glycoprotein capable of binding iron, which exists in exocrine such as milk and is a nutritionally and pharmacologically important milk protein Several methods to separate and purify lactoferrin has been known, including the method of using ion exchange resin (Gordon et al., Biochim. Biophys. Acta., 60:410–411, 1962), the method adopting heparin-affinity chromatography (Blockberg et al., FEBS Lett., 109:180, 1980), the method that uses affinity column immobilized with anti-lactoferrin monoclonal antibody (Japanese Patent Laid-Open Publication No.

61-145200), and the one using sulfuric esterified carrier (Japanese Patent Laid-Open Publication No. 63-255300). As long as it is not denatured and is capable of binding iron, lactoferrin obtained by any method may be used in the present invention.

In the present invention, either a mixed solution of lactoferrin, iron preparation and sodium bicarbonate or aqueous solution of iron lactoferrin is prepared and ionic strength of the said solutions is adjusted to meet the conditions of the following formulae, after which it is sterilized by heat. Sodium bicarbonate is used here to increase the affinity between lactoferrin and iron. But since the amount needed is small, sodium bicarbonate present in tap water in slight amount may be utilized.

$$\log I \leq -T/66.7 - 0.1$$

(wherein $60 \leq T \leq 80$)

$$\log I \leq -1.3$$

($T \geq 80$)
(T indicates temperature of sterilization in degrees Celsius.)

In the present invention, if the mixture of the solution containing beverage ingredients such as sour agents, flavoring, sugars and vitamins and either water solution of lactoferrin, iron preparation and sodium bicarbonate or water solution of iron lactoferrin, has ionic strength (I) that is adjustable to the above conditions then the lactoferrin solution and beverage-ingredient solution may be first mixed, the ionic strength (I) of the mixture adjusted to the above-noted conditions, sterilized by heat, cooled and then filled in sterilized containers to provide iron-fortified beverage.

If the solution to which beverage-ingredient is added does not satisfy the ionic strength (I) conditions, or cannot be adjusted to satisfy them, then either the aqueous solution of lactoferrin, iron preparation and sodium bicarbonate or the aqueous solution of iron lactoferrin is adjusted to meet the ionic strength (I) conditions, after which the beverage-ingredient solution and lactoferrin solution are sterilized by heat and cooled separately, and then are mixed and filled in sterilized containers to provide iron-fortified beverage.

Thus adjusting the ionic strength of the solution containing lactoferrin and then sterilizing by heat prevents denaturation of lactoferrin and maintains lactoferrin's functions because the ionic strength of the solution is low when placed under heat for sterilization.

The relationship between lactoferrin's iron-binding capacity and lactoferrin aqueous solution's ionic strength and temperature is shown in FIG. 1.

The Figure shows the percentage of iron-binding capacity of lactoferrin aqueous solution whose ionic solution is adjusted, heated at each temperature for 30 minutes and cooled immediately, as compared with iron-binding capacity of unheated lactoferrin aqueous solution.

If the temperture (T) is lower than 60 degrees Celsius, lactoferrin does not denature and there is no need to adjust the ionic strength of the solution, whereas, if (T) is 60 degrees Celsius or higher and the ionic strength (I) does not satisfy the requirements, lactoferrin will lose some of its iron-binding capacity or may precipitate. Therefore, to sterilize lactoferrin aqueous solution of higher salt concentration by heat, it is necessary to desalt the solution to adjust its ionic strength (I) to meet the aforementioned requirements.

In the present invention, desirable content of lactoferrin in the beverage is 0.1–6.0% (or 0.1–6grams per 100 milliliter). This lactoferrin content in the beverage is based on the supply of iron that coexists. As 1 gram of lactoferrin supplies 1.5 milligrams of iron because of its iron-binding capacity, a lactoferrin content of less than 0.1% in the beverage means an iron supply of 0.15 milligram per 100 milliliter, which makes the beverage impractical as iron supplier since it is necessary to drink 700 milliliters or more per day to supply iron comparable to 1.0 milligrams of iron that is generally known to be excreted daily.

On the other hand, the lactoferrin content of more than 6% increases the viscosity of the mixed solution of lactoferrin, iron preparation and sodium bicarbonate, which slows down the velocity of diafiltration performed to adjust ionic strength (I), a factor that makes the adjustment more inconvenient.

Furthermore, in the case where iron lactoferrin and other beverage ingredients are dissolved, mixed and sterilized by heat, lactoferrin concentration of 6% or less is desirable: if above 6%, problems of processing arises because of increased viscosity and longer time needed to dissolve the greater amount of lactoferrin.

The lactoferrin content of 6% means an iron content of 9 milligrams per 100 grams beverage, which offers sufficient iron supply considering the high absorption ratio of iron lactoferrin.

Moreover, it is desirable that the iron preparation or iron lactoferrin used in the present invention account for 0.15–12.0 milligrams as iron per 100 milliliters of beverage. If the content of iron is below 0.15 milligram, one has to drink 700 milliliters or more of the beverage in order to take iron comparable to 1.0 milligram iron excreted per day. On the other hand, iron content of more than 12 grams causes bitterness peculiar to iron, making the product unsuitable as a drink.

EXAMPLES

The examples that follow illustrates the present invention.

EXAMPLE 1

Ten liters of sulfuric esterified Chitopearl, (brand-name), cross-linked chitosan available on the market, with sulfuric anhydride in the usual manner was filled in a column of 32 centimeters in diameter and 200 centimeters long, to which 500 liters skimmed milk was passed through at a rate of 200 liters per hour. After washing the column with 50 liters of 0.3-mole sodium chloride aqueous solution, lactoferrin adsorbed by the column was eluted with 30 liters of 1.0-mole sodium chloride aqueous solution. The lactoferrin solution thus obtained was desalted with samll ED unit (TS-210, by Tokuyama Soda), after which it was concentrated to 10 times the original solution with UF unit (B-2, by Amikon) and was freeze-dried.

The amount of lactoferrin thus collected was 6 grams, with measured purity of 95%. Amount of iron bound by the lactoferrin was measured to be 0.2 milligram Fe per gram of protein, and lactoferrin's iron-binding capacity was confirmed to be 98%.

Solution containing lactoferrin and iron (solution A), and solution of beverage ingredients (solution B) were prepared according to the following formulae:

| Solution A | |
| --- | --- |
| lactoferrin | 600 grams |
| sodium bicarbonate | 86 |
| ferric chloride hexahydrade | 10 |

The above ingredients were dissolved in water to make 50 liters solution.

| Solution B | |
| --- | --- |
| sodium ferrous citrate | 48 grams |
| isomerized sugar | 8,000 |
| citric acid | 800 |
| sodium citrate | 800 |
| vitamin $B_2$ | 1.1 |
| vitamin $B_6$ | 2.2 |
| vitamin C | 5.5 |
| folic acid | 0.4 |
| flavoring | 100 |
| 1/5 concentrated fruit juice | 1,000 |

The above ingredients were dissolved in water to make 50 liters solution.

The solution A was diafiltered to eliminate low-molecular ions and was adjusted to the ionic strength of $10^{-3}$ or lower, after which it was sterilized by heat (maintained at 93 degrees Celsius for 3 minutes) with plate heat exchanger, cooled (to 5-10 degrees Celsius) and stored in a sterilized tank.

The solution B was also sterilized by heat (held at 93 degrees Celsius for 20 seconds) with plate heat exchanger and cooled (to 5-10 degrees Celsius), after which it was added to the above described solution A in the tank and mixed.

The mixed solution was then filled in sterilized cartons in an aseptic room to obtain iron-fortified beverage.

The beverage thus obtained (pH 3.8, 5.81 milligrams iron per 100 milliliter) was also excellent in flavor.

EXAMPLE 2

Using lactoferrin prepared as in Example 1, solution containing lactoferrin and iron was made by dissolving 600 grams lactoferrin, 86 grams sodium bicarbonate and 10 grams ferric chloride hexahydrate in water to total 50 liters. This aqueous solution was diafiltered to eliminate low-molecular ions and was adjusted to the ionic strength of 0.001 or below, to which was added 16 grams sodium ferrous citrate, 10,000 grams sucrose, 100 grams flavoring and 7,000 grams frozen, 1/5 concentration of fruit juice (B×45). More water was added to make up a total 100 liters solution to obtain iron-fortified beverage.

This iron-fortified beverage was then sterilized by using plate heat exchanger (at 93 degrees Celsius for 2 to 3 seconds), bottled, held upside down for 20 seconds and cooled (to 5-10 degrees Celsius) to obtain final iron-fortified beverage product.

The resultant beverage had pH 3.7, ionic strength of 0.02 and iron content of 2.4 milligrams per 100 milliliter, with excellent taste and appearance.

EXAMPLE 3

The sulfonated Chitopearl used in the Example 1 was regenerated by passing through 2.0 mole sodium chloride aqueous solution and then 0.15 mole sodium chloride aqueous solution.

Ten liters of this regenerated Chitopearl and 1,000 liters cheese whey were mixed under stirring for one hour, after which this slurry was washed with 50 liters of 0.3 mole sodium chloride aqueous solution. Then lactoferrin absorbed by this slurry was eluted with 1.0 mole sodium chloride aqueous solution. After adding 500 milligrams ferric chloride, the lactoferrin solution thus obtained was passed through ion-exchange desalting resin to eliminate excess ion, and was spray-dried to obtain 48 grams bovine lactoferrin capable of binding iron. The collected bovine lactoferrin had purity of 95% with iron content measuring 1.3 milligrams Fe per gram of protein. Iron saturation was confirmed to be at least 93%.

Using iron lactoferrin thus obtained, iron-fortified beverage was prepared by the following formula:

| Combination | |
| --- | --- |
| iron lactoferrin | 600 grams |
| sucrose | 11,000 |
| flavoring | 100 |
| sodium ferrous concentrate | 16 |
| frozen fruit juice concentrate (Brix 45) | 12,000 |

The above ingredients were dissolved in water to make 100 liters solution.

This iron-fortified beverage was then heated in a jacket tank to sterilize at 70 degrees Celsius for 15 minutes, followed by filling in sterilized bottles to obtain iron-fortified product.

The iron-fortified beverage thus obtained has pH 3.3, ionic strength of 0.058 and iron content of 2.5 milligrams per 100 milliliter, with excellent taste and appearance.

EXAMPLE 4

Using iron lactoferrin prepared as in Example 3, iron lactoferrin solution (solution A) and beverage-ingredient solution (solution B) were made according to the following formulae.

Solution A: prepared by dissolving 600 grams iron lactoferrin in water to make 50 liters solution Solution B: prepared as in Example 1.

Iron-fortified beverage was processed according to the method described in Example 1.

EXAMPLE 5

This example shows the changes in lactoferrin activity during the production process of Example 1, measured by immunological method utilizing complement fixation reaction. Table 2 shows the result.

TABLE 2

| Measurement taken | Ratio of Activity |
| --- | --- |
| before mixing | 100 |
| after diafiltration | 98 |
| after sterilization by heat | 88 |
| In finished product | 87 |

As shown in Table 2, activity of lactoferrin in finished product was 13% lower compared with lactoferrin before mixing, but the difference has no practical effect on the function of lactoferrin.

EXAMPLE 6

This example shows the effect of iron-fortified beverage in the recovery of anemia.

Six-weeks-old Wistar rats, made anemic (hemoglobin [Hb] concentration: 8 grams per deciliter blood or below) by feeding with iron-eliminated feed (0.25 milligrams iron per 100 grams feed) for 3 weeks, were divided into four groups. The first group was given the beverage obtained in the Example 1 (iron content: 5.81 milligrams per milliliter); the second group, beverage prepared as in Example 1, except that lactoferrin was eliminated and sodium ferrous citrate was used as iron preparation, these two groups were fed with iron-eliminated feed and deionized water; the third, market feed (20 milligrams iron per 100 grams) and deionized water; and the fourth, iron-eliminated feed and deionized water only. Then, except for the group given market feed, the rats of each group were divided into three groups so that their average blood [Hb] concentration approximates, and each rat belonging to the group given the beverage of the present invention and to the group given the beverage containing sodium ferrous citrate as iron preparation but not lactoferrin was given 0.86 milliliter beverage orally each day so that iron supply would be 50 micrograms per rat per day.

After every two weeks since the rats began to get iron preparation, their blood was drawn to measure hemoglobin [Hb] concentration, hematocrit [Ht] value and number of red blood cells [RBC].

Figure 4:
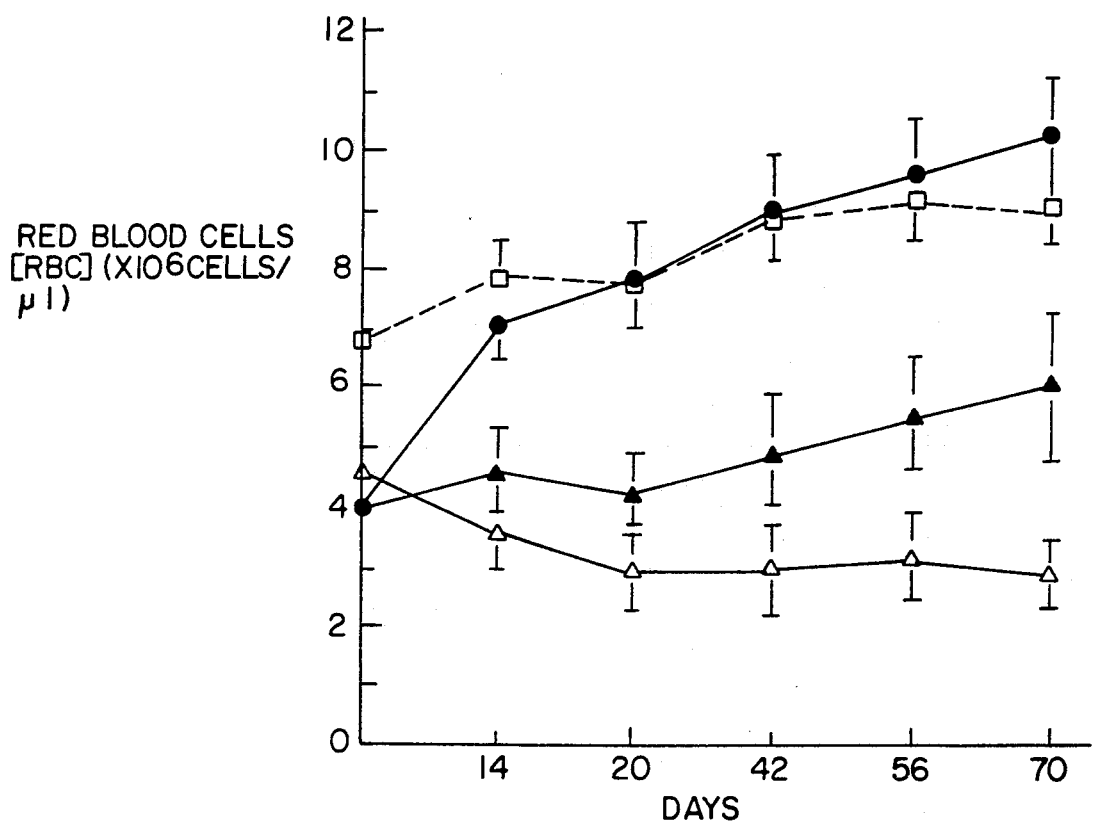
FIG. 4, the changes of the number of red blood cells [RBC] with the passage of days.

The results of [Hb] concentration, hematocrit [Ht] value and number of red blood cells [RBC] are shown in FIGS. 2, 3 and 4.

As seen in each figure, the data of the group given the iron-fortified beverage of the present invention shown in Example 1 were equivalent to the group given market feed containing iron, displaying its significant capability to recover from anemia. It was also clear that the group of rats given beverage that contain sodium ferrous citrate as iron preparation but not lactoferrin show little recovery from anemia even after 70 days.

Therefore, the present invention makes it possible to obtain an iron-fortified beverage, of which iron is absorbed from the digestive tract at a high ratio, and which retains physiological functions of lactoferrin that coexist with iron.

We claim:

1. A method of preparing an iron-fortified beverage containing lactoferrin capable of binding iron, comprising adjusting either an aqueous solution containing lactoferrin, iron preparation and sodium bicarbonate, or aqueous solution of iron lactoferrin to a desired ionic strength (I) sterilizing said iron lactoferrin by heat, cooling mixing said iron lactoferrin solution with a solution of beverage ingredients which has been also sterilized by heat and cooled wherein said desired ionic strength is determined by the following formula:

$$\log I \leq -T/66.7 - 0.1$$

(wherein $60 \leq T \leq 80$)

$$\log I \leq -1.3$$

($T \geq 80$)
(T indicates temperature of sterilization in degrees Celsius.)

2. A method of processing iron fortified beverage containing lactoferrin capable of binding iron, comprising adjusting either an aqueous solution of lactoferrin, iron preparation and sodium bicarbonate, in which other beverage ingredients are also dissolved, or the aqueous solution of iron lactoferrin and other beverage ingredients to a desired ionic strength (I) and sterilizing said solution by heat wherein said desired ionic strength as determined by the following formula:

$$\log I \leq -T/66.7 - 0.1$$

(wherein $60 \leq T \leq 80$)

$$\log I \leq -1.3$$

($T \geq 80$)
(T indicates temperature of sterilization in degrees Celsius.)

3. A method of preparing iron-fortified beverage according to any of claim 1 through claim 2, wherein lactoferrin is used in an amount that makes the final concentration in the beverage 0.1-6 grams lactoferrin per 100 milliliter.

4. A method of processing iron-fortified beverage according to any of claim 1 through claim 3, wherein iron preparation is used in an amount that makes the final iron concentration in the beverage 0.15-12.0 milligrams per 100 milliliter.

* * * * *